(12) United States Patent
Han et al.

(10) Patent No.: US 8,201,660 B2
(45) Date of Patent: Jun. 19, 2012

(54) VALVE FOR A MOTOR VEHICLE EXHAUST SILENCER, AND SILENCER COMPRISING A VALVE OF THIS TYPE

(75) Inventors: Myeong Han, Incheon (KR); Ahmed Aouidef, Saint Maurice sur Fessard (FR); David Gafforelli, Audincourt (FR)

(73) Assignee: Faurecia Systemes d'Echappement, Nanterre (FR)

( * ) Notice: Subject to any disclaimer, the term of this patent is extended or adjusted under 35 U.S.C. 154(b) by 52 days.

(21) Appl. No.: 12/524,450

(22) PCT Filed: Jan. 25, 2008

(86) PCT No.: PCT/FR2008/050120
§ 371 (c)(1),
(2), (4) Date: Jan. 25, 2010

(87) PCT Pub. No.: WO2008/102093
PCT Pub. Date: Aug. 28, 2008

(65) Prior Publication Data
US 2010/0126159 A1 May 27, 2010

(30) Foreign Application Priority Data
Jan. 26, 2007 (KR) .................. 10-2007-0008507

(51) Int. Cl.
*F01N 1/00* (2006.01)
(52) U.S. Cl. ........... 181/254; 181/237; 181/282; 60/324
(58) Field of Classification Search .................. 181/282, 181/237, 254; 60/324
See application file for complete search history.

(56) References Cited

U.S. PATENT DOCUMENTS

| | | | | |
|---|---|---|---|---|
| 5,747,753 | A * | 5/1998 | Eder | 181/282 |
| 6,338,246 | B2* | 1/2002 | Eguchi et al. | 60/324 |
| 6,581,721 | B2* | 6/2003 | Nagai et al. | 181/237 |
| 7,066,296 | B2* | 6/2006 | Uegane et al. | 181/254 |
| 7,310,942 | B2* | 12/2007 | Shiga et al. | 60/324 |
| 7,426,979 | B2* | 9/2008 | Nagai | 181/237 |
| 7,896,130 | B2* | 3/2011 | Hill et al. | 181/254 |
| 2004/0065503 | A1 | 4/2004 | Uegane | |
| 2006/0027420 | A1* | 2/2006 | Hahnl et al. | 181/283 |
| 2007/0080020 | A1* | 4/2007 | Emmett | 181/237 |
| 2007/0107981 | A1* | 5/2007 | Sicotte | 181/237 |
| 2010/0146957 | A1* | 6/2010 | Ambrosino et al. | 60/324 |

FOREIGN PATENT DOCUMENTS

| | | |
|---|---|---|
| DE | 4323642 | 1/1995 |
| DE | 29612708 | 10/1996 |
| WO | 9812422 | 3/1998 |

OTHER PUBLICATIONS

International Search Report dated Apr. 9, 2008, in PCT application.

* cited by examiner

*Primary Examiner* — Forrest M Phillips
(74) *Attorney, Agent, or Firm* — Young & Thompson

(57) ABSTRACT

A valve suitable for closing an orifice (36) of a structure (10) of a silencer (1) for a motor vehicle exhaust line, includes a closing component (44) which is connectable to the structure (10) and capable of adopting a position for closing the orifice (36). The closing component (44) is capable of rising by bending from its closure position. The closing component (44) includes a closure plate (54) capable of closing the orifice (36) and at least one connection plate (56) capable of connecting the closure plate (54) to the structure (10), the closure plate (54) and the or each connection plate (56) having differing thicknesses and/or being made of materials having differing mechanical characteristics.

10 Claims, 3 Drawing Sheets

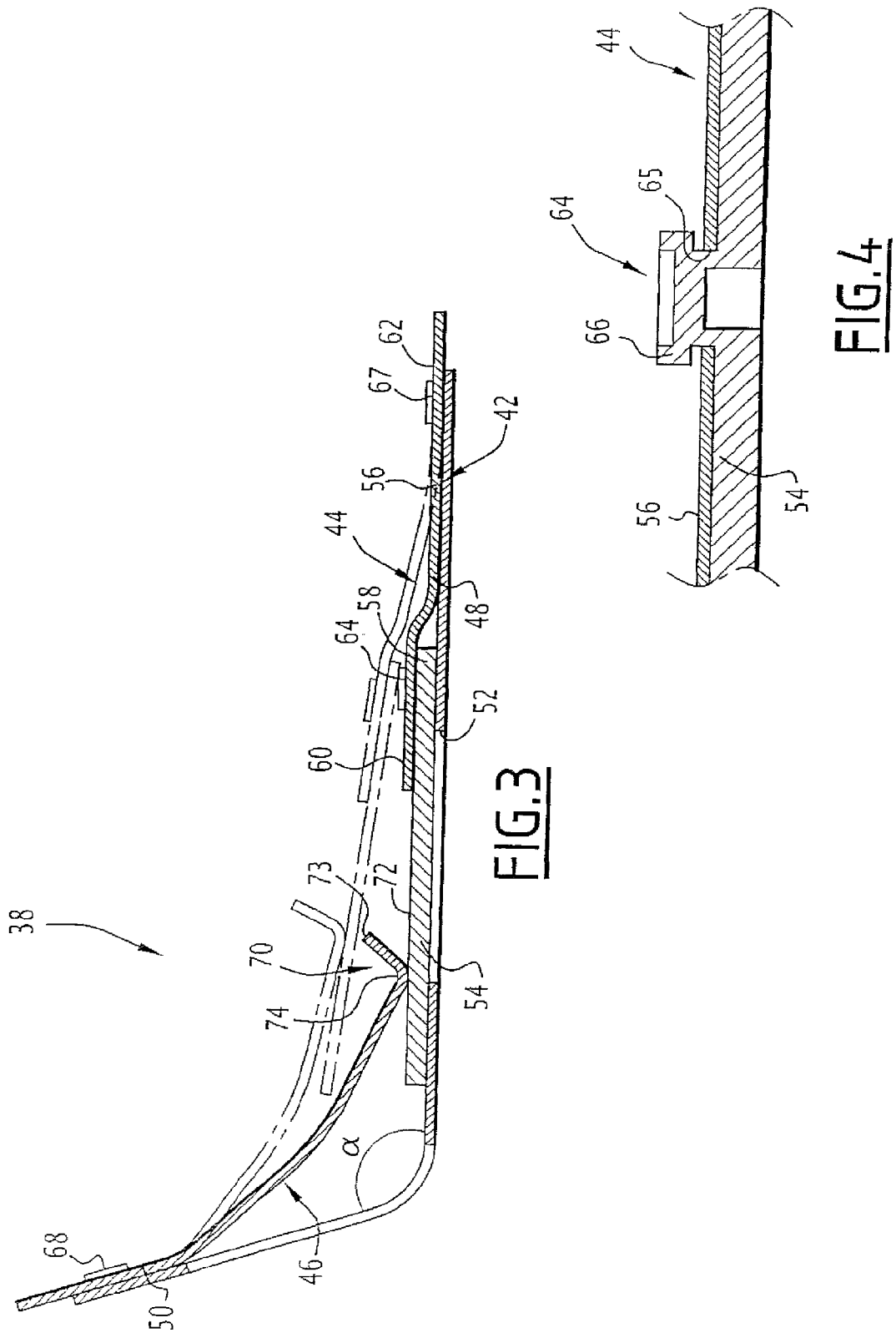

VALVE FOR A MOTOR VEHICLE EXHAUST SILENCER, AND SILENCER COMPRISING A VALVE OF THIS TYPE

The invention relates, in general, to motor vehicle exhaust line silencers.

BACKGROUND OF THE INVENTION

More specifically, the invention relates, in accordance with a first aspect, to a valve suitable for closing an orifice in a structure of a silencer for a motor vehicle exhaust line, the valve comprising a closing component which is connectable to the structure and capable of adopting a position for closing the orifice, the closing component being capable of rising by bending from its closure position.

DESCRIPTION OF THE RELATED ART

A valve of this type is known from document US-A-2004/0065503, in which the closing component is a rectangular, thin and resilient steel plate. A proximal end of the closing component is welded to a seat, itself rigidly fixed to an internal partition of the silencer. The closing component carries, at a distal end portion closing the orifice, two mutually opposed raised edges. These edges rigidify the distal end portion of the closing component.

A closing component of this type is expensive, both as a result of the material used and as a result of the shaping work necessary for the production thereof.

In this context, the invention seeks to propose a less expensive valve.

SUMMARY OF THE INVENTION

The invention accordingly relates to a valve of the aforementioned type, characterised in that the closing component comprises a closure plate capable of closing the orifice and at least one connection plate capable of connecting the closure plate to the structure, the closure plate and the or each connection plate having differing thicknesses and/or being made of materials having differing mechanical characteristics.

The valve may also have one or more of the following features, taken individually or in any technically possible combination:

- the closure plate and the or each connection plate are each made of a metallic material;
- the or each connection plate is more flexible than the closure plate;
- the closure plate is a stainless steel plate;
- the closure plate has a thickness of between 0.5 and 5 mm;
- the or each connection plate has a resilience RP 0.2% (yield strength) of greater than 400 MPa at a temperature of 600° C.;
- the or each connection plate is a refractory steel plate comprising at least 30% by mass of nickel;
- the or each connection plate has a thickness of between 0.05 and 1 mm; and
- the closing component comprises two mutually parallel connection plates, each capable of connecting the closure plate to the structure.

In accordance with a second aspect, the invention the invention relates to a silencer comprising a valve having the foregoing features, in accordance with claim 1.

BRIEF DESCRIPTION OF THE DRAWINGS

Further features and advantages of the invention will emerge from the detailed description given hereinafter by way of non-limiting example and with reference to the appended figures, in which:

FIG. 3 is a cross-section of the valve of FIG. 2, taken along the angle of incidence of arrows III, solid lines indicating the closing component in its closure position and broken lines indicating the closing component raised from its seat; and FIG. 4 is a cross-section of a detail of FIG. 2, taken along the angle of incidence of arrows IV.

DETAILED DESCRIPTION OF THE PREFERRED EMBODIMENTS

Figure 1:
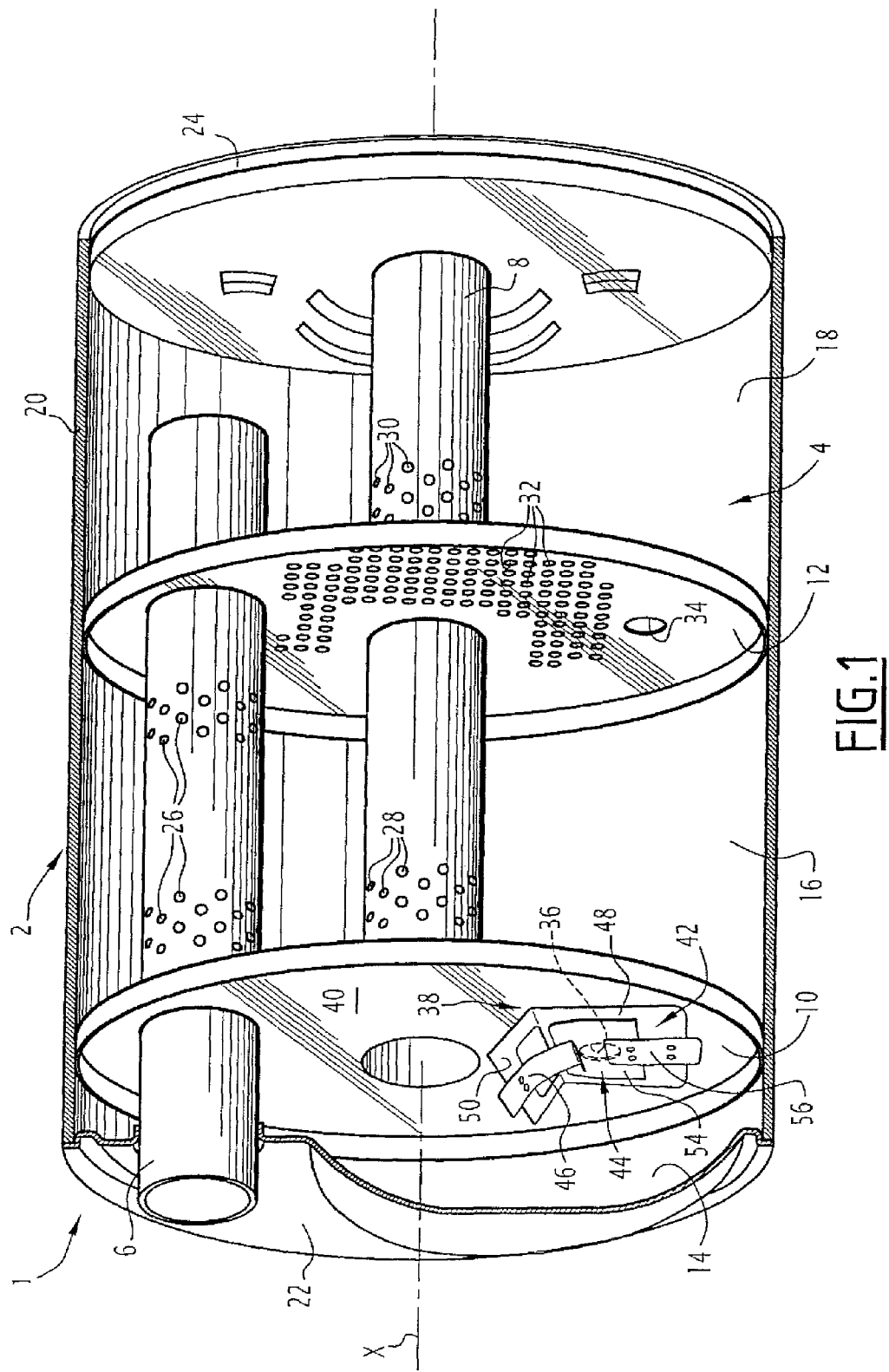
FIG. 1 is a perspective view of a silencer equipped with a valve according to the invention, a portion of the outer casing of the silencer having been removed to allow the interior of the silencer to be seen.

The silencer 1 illustrated in FIG. 1 is intended to be inserted into the exhaust line of a thermal engine motor vehicle. It comprises an outer shell 2 delimiting an internal volume 4, an inlet duct allowing the internal volume 4 to communicate with an upstream portion of the exhaust line, an outlet duct 8 allowing the internal volume to communicate with a downstream portion of the exhaust line, and two inner cups 10 and 12 dividing the internal volume 4 into three chambers 14, 16 and 18 respectively.

The outer shell 2 comprises a tubular portion 20, and upstream and downstream end plates 22 and 24 respectively closing the upstream and downstream ends of the tubular portion 20. The cups 10 and 12 extend substantially perpendicularly to the central axis X of the tubular portion 20 and are substantially parallel to the end plates 22 and 24. They extend over the entire cross-section of the tubular portion 20. The first chamber 14 extends between the upstream end plate 22 and the first cup 10, the second chamber 16 between the cups 10 and 12, and the third chamber 18 between the cup 12 and the downstream end plate 24.

The inlet duct 6 extends parallel to the central axis X and passes in succession through the end plate 22, the chamber 14, the cup 10, the chamber 15 and the cup 12. One end of the inlet duct is connected to the upstream portion of the exhaust line while its opposite end opens inside the chamber 18. The inlet duct comprises a large number of small orifices 26 allowing the interior of the duct 16 to communicate with the second chamber 16.

One end of the outlet duct 8 is connected to the downstream portion of the exhaust line while its opposite end opens into the first chamber 14. The outlet duct extends along the central axis X. The duct 8 passes in succession through the cup 10, the chamber 16, the cup 12, the chamber 18 and the downstream end plate 24. The duct 8 is perforated by a large number of small orifices 28 allowing the interior of the duct 8 to communicate with the second chamber 16. It is also perforated by a large number of small orifices 30 allowing the interior of the duct 8 to communicate with the third chamber 18.

Moreover, the cup 12 is perforated by a large number of small orifices 32 allowing the second and third chambers 16 and 18 to communicate with each other. The cup 12 is also perforated by an orifice 34 of large size relative to the size of the orifices 32, it also allowing the chambers 16 and 18 to communicate with each other. The cup 10 is itself perforated by an orifice 36 of a size, for example, similar to that of the orifice 34 and capable of allowing the chambers 14 and 16 to communicate with each other.

In order to vary the resistance provided by the silencer to the circulation of the exhaust gases, this silencer 1 comprises a valve 38 capable of closing or clearing the orifice 36. The valve 38 is rigidly fixed to a face 40 of the cup 10 that is turned toward the chamber 14.

Figure 2:
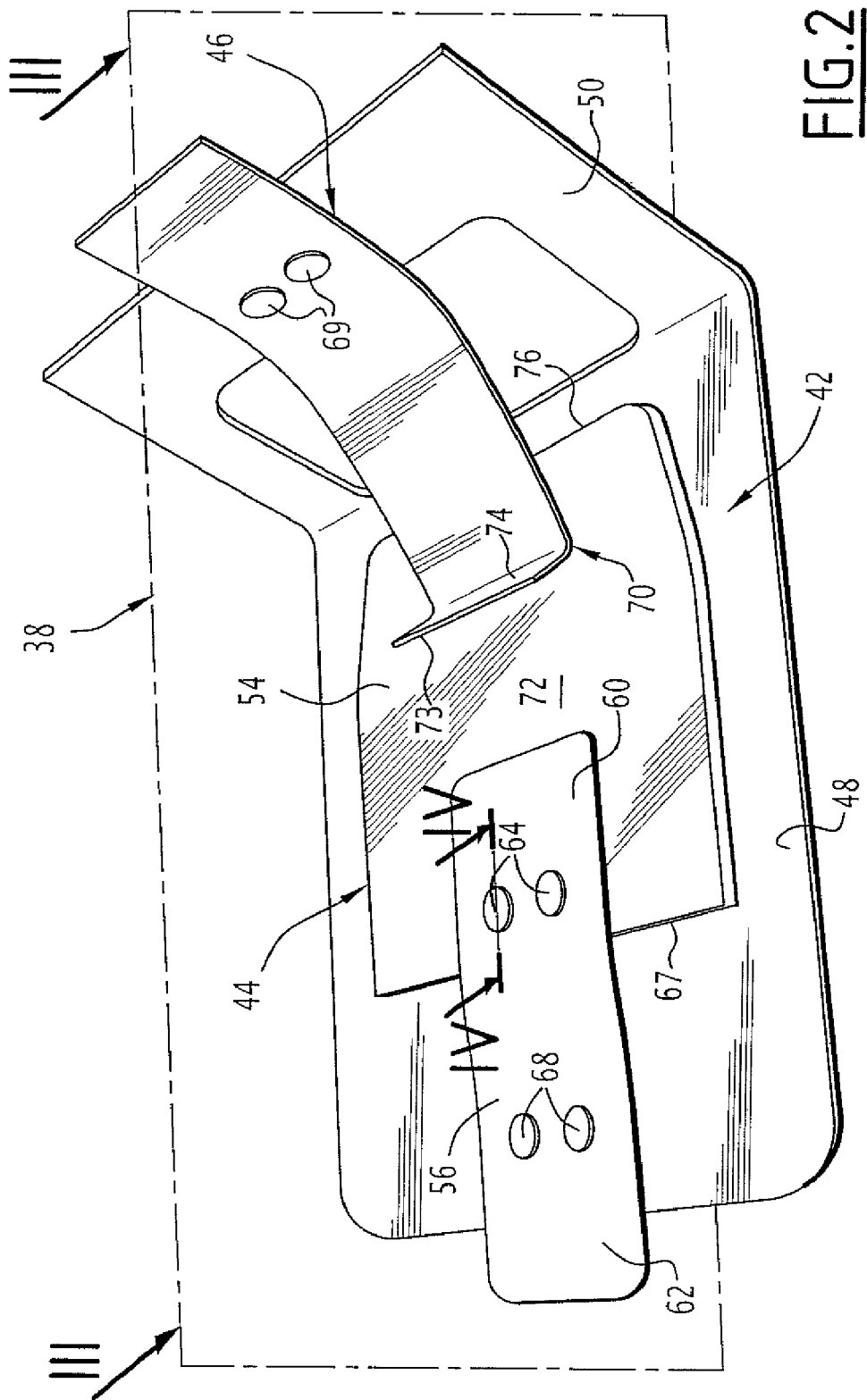
FIG. 2 is an enlarged view of the valve of FIG. 1.

The valve 38, as shown in FIGS. 2 and 3, comprises a support plate 42 rigidly fixed to the face 40 of the cup 10, a closing component 44 capable of adopting a position for closing the orifice 36 and capable of rising by bending from its closure position, and a strip 46 for returning the closing component 44 to the closure position.

The support plate 42 is a stainless steel plate folded into an L shape. It comprises a wing 48 pressed against the cup 10 and rigidly fixed to this cup, and a wing 50 raised from the wing 48 and forming an angle α typically of between 90° and 135° to the wing 48. An aperture 52 is formed in the wing 48 so as to be congruent with the orifice 36. The aperture 52 has a through-section at least greater than that of the orifice 36 and does not in any way close this orifice.

The closing component 44 comprises a closure plate 54 capable of closing the aperture 52, and therefore the orifice 36, and a flexible connection plate 56 connecting the closure plate 54 to the support 42.

The closure plate 54 is a stainless steel plate having a, for example substantially square, shape suitable for completely closing the aperture 52. The plate has a thickness of between 0.5 mm and 5 mm, preferably between 1 mm and 2 mm, and typically equal to approximately 1.5 mm.

The peripheral surface 58 of the face 40 surrounding the aperture 52 forms a seat for the closure plate 54. Thus, in the closure position, the plate 54 completely covers the aperture 52 and is in contact with the support 42 over the entire periphery of surface 58. The zones of mutual contact between the plate 54 and the surface 58 have surface states such that the closure plate 54 is pressed tightly against its seat.

The connection plate 56 has a rectangular, elongate shape in a longitudinal direction. It is fixed, by a first longitudinal end portion 60, to the closure plate 54 and, by a second end portion 62 remote from the portion 60, to the support plate 42. The plate 56 is fixed to a zone of the wing 48 remote from the wing 50.

As shown in FIG. 2, in a transverse direction, the plate 56 is narrower than the plate 54. The plate 56 is fixed transversely to the centre of the plate 54, the plate 54 protruding transversely by the same distance on either side of the plate 56.

The connection plate 56 is more flexible than the closure plate. The connection plate 56 has a resilience, assessed in accordance with the RP 0.2% (yield strength) standard, of greater than 400 MPa at a temperature of 600° C., preferably greater than 500 MPa at a temperature of 600° C., and typically being 650 MPa at 600° C.

The connection plate 56 is a refractory steel plate comprising at least 30% by mass of nickel, and typically comprising 60% nickel. It is typically an alloy sold under the trade name Inconel. It has a thickness of between 0.05 mm and 1 mm, preferably between 0.1 mm and 0.5 mm, and typically equal to 0.25 mm.

The connection plate 56 is rigidly fixed to the closure plate 54 by means which do not cause the plate 54 to undergo deformation during the fixing operation. It is extremely important that the plate 54 remains flat so as not to detract from the tightness of the contact between the plate 54 and the surface 58 acting as a seat.

For example, the connection plate 56 can be fixed to the closure plate 54 by welding, so the heat load placed on the closure plate 54 during welding does not cause said plate to undergo deformation.

The plate 56 and the plate 54 can also be fixed to each other by two clinching points 64, as illustrated in FIG. 2. Clinching is a known metallurgical process, and only some general information will be provided hereinafter with reference to FIG. 4.

The clinching points 64 are obtained by firstly forming orifices 65 in the connection plate. The closure plate 54 is then positioned against the plate 56, and a suitably shaped die is positioned at the mouth of each orifice 65, against the face of the plate 56 remote from the plate 54. The plate 54 is then stamped in line with the orifices 65 using a punch. The punch engages with the orifice 66 and locally deforms the material forming the plate 54. This material is pushed back through the orifice 65 against the punch. The punch is shaped in such a way that the material of the plate 54 forms a rivet 66 joining the plates 54 and 56 together.

The clinching points 64 are located in proximity to a transverse edge 67 of the plate 54.

The connection plate 56 is rigidly fixed to the wing 48 by welding or two clinching points 68.

The resilient strip 46 has an elongate shape. It is rigidly fixed to the wing 50 raised from the support plate, for example by two clinching points 69 or by any other suitable means. One end 70, remote from the clinching points 69, of the strip rests on a face 72 of the plate 54 opposite the orifice 36. The end 70 comprises a terminal portion 73 folded, opposite the face 72, about a transverse folding line. The end 70 rests on the face 72 in the region of the folding line 74.

The strip 46 has a thickness of between 0.05 mm and 0.5 mm, preferably between 0.1 mm and 0.3 mm, and typically being 0.25 mm. The strip 46 is a refractory steel plate comprising at least 30% by mass of nickel, and typically comprising 60% nickel. It is, for example, an alloy sold under the trade name Inconel.

The strip 46 exerts a restoring force on the closure plate 54 and urges said plate towards its closure position against the plate 42.

The strip 46 is disposed substantially in the extension of the connection plate 56. The end 70 of the resilient strip rests against a zone of the closure plate that is in proximity to the transverse edge 76 of the plate opposite the edge 67.

Further details will now be provided concerning the operation of the silencer described hereinbefore.

The exhaust gases penetrate the silencer via the inlet duct 6. A portion of the gases passes through the orifices 26 of the inlet duct and penetrates the second chamber 16. The remainder of the exhaust gases passes into the third chamber 18. A portion of these gases passes directly from the chamber 18 into the outlet duct 8 through the orifices 30. They are then directed toward the downstream portion of the exhaust duct. A further portion of the exhaust gases penetrates the second chamber 16 from the chamber 18, passing through the orifices 32 and 34.

When the engine is operating at low speed, the difference in pressure between the chambers 14 and 16 is slight, so the pressure exerted on the closing component 14 by the gases from the chamber 16 is not sufficient to compensate for the restoring force of the resilient strip 46. The closing component is in its position for closing the orifice 36.

In this case, all the gases penetrating the chamber 16 via the orifices 26, 32, or 34 pass through the orifices 28 in the outlet duct and are directed toward the downstream portion of the exhaust line.

When the engine is operating at a higher speed, the difference in pressure between the chambers 14 and 16 becomes sufficient to counteract the restoring force of the resilient strip 46. This difference in pressure causes the closing component 44 to rise, as indicated by broken lines in FIG. 3. The connection plate 56 bends in a zone located between the clinching points 64 and the clinching points 66, causing the closure plate 54 to move away from the wing 48 of the support plate. As the plate 54 is more rigid than the plate 56, it does not bend. The end 70 of the resilient restoring strip slides along the face 72 of the closure plate in the direction of the connection plate 56.

The gap between the closure plate 54 and the wing 48 of the support plate, i.e. the degree of opening of the valve 38, is dependent on the difference in pressure between the chamber 14 and the chamber 16.

As a result of the fact that the orifice 36 is no longer closed, a portion of the exhaust gas penetrating the chamber 16 through the orifices 26, 32 or 34 passes through the orifice 36 and penetrates the chamber 14, then flows into the duct 8 via the end thereof communicating with the chamber 14. These gases are then directed toward the downstream portion of the exhaust line through the duct 8.

Thus, when the engine is operating at high speed, there is created a new pathway from the chamber 16 to the outlet duct 8, via the chamber 14, so the resistance provided by the silencer 1 to the flow of the exhaust gases is reduced.

The valve described hereinbefore has a large number of advantages.

As a result of the fact that its closing component comprises a closure plate and at least one connection plate capable of connecting the closure plate to an internal partition in the silencer, the closure plate and the connection plate having differing thicknesses and/or being made of materials having differing mechanical characteristics, the valve is less expensive. The connection plate, which is made of a more expensive material, is as small as possible. The portion of the closing component closing the orifice of the internal partition, which does not have to be flexible, is made of a less expensive material. Only the portion of the closing component that is useful for producing the bending allowing the orifice to be cleared is made of a flexible and expensive material.

Moreover, a rigid plate is advantageously used for closing the orifice. A plate of this type provides an improved seal. In particular, a thicker and more rigid plate will undergo less deformation as a result of the difference in pressure or temperature between the two faces of the closing component. Similarly, it will be subjected to less vibration under the influence of the alternating opening and closing movements of the closing component.

The fact that the connection between the closure plate and the connection plate is produced by clinching points or by a weld subjecting the closure plate to a low heat load means that the closure plate does not have to undergo deformation during the fixing process.

The valve described hereinbefore can have a large number of variations.

The closing component can comprise not only a single connection plate, but two or more connection plates. In this case, the connection plates are parallel to one another. Each of them is fixed, on one side, to the closure plate and, on the opposite side, to the support plate.

Similarly, the valve can comprise a plurality of flexible restoring strips, parallel to one another. These strips are all fixed to the raised wing of the support plate and their respective opposite ends all rest on the closure plate.

Each strip can rest not on the closure plate but on the connection plate, said connection plate extending, in this case, over almost the entire longitudinal length of the closure plate.

The valve can comprise a stop limiting the movement of the closure plate from its closure position, and therefore accordingly limiting the degree of opening of the valve.

It is possible to vary the angle of inclination α between the raised wing of the support plate and the wing pressed against the cup, so as to modulate the supporting force exerted by the resilient restoring strip or strips onto the closure plate.

In the embodiments described hereinbefore, the closure plate and the connection plate have differing thicknesses and are made of materials having differing mechanical characteristics. However, it is possible to make the two plates of the same material but having differing thicknesses, these thicknesses being chosen so that the closure plate is more rigid than the connection plate. Alternatively, it is possible for the two plates to have the same thickness but to be made of differing material, chosen so that the closure plate is more rigid than the connection plate.

It is possible to fix the connection plate directly to the cup and not to the support plate.

The invention has been described for an embodiment in which the valve closes an orifice in an internal partition of a silencer. In other applications, the valve can close the end of the inlet duct of the silencer that is connected to the upstream portion of the exhaust line, the end of the inlet duct opening inside the silencer, or an orifice formed in a common portion of the inlet duct. Similarly, the valve can close one of the two ends of the outlet duct of the silencer, or an orifice formed in a common portion of this duct. The silencer can also comprise at least one inner tubular duct allowing two chambers of the silencer to communicate with each other. The valve can, in this case, close one of the two ends of the inner duct or an orifice formed in a common portion of this duct.

The silencer described hereinbefore can be of any type, for example a welded rolled silencer, a crimped rolled silencer, or a silencer formed by two stamped half-shells. It can comprise more or less than three inner chambers, more or less than two cups, and can comprise one or more inner ducts allowing chambers to communicate with one another.

The invention claimed is:

1. A silencer for a motor vehicle exhaust line, the silencer (1) comprising:
    an outer shell (2) delimiting an internal volume (4);
    at least one internal partition (10) dividing the internal volume (4) into two chambers (14, 16);
    an orifice (36) formed in the internal partition (10); and
    a valve (38) for closing the orifice (36), the valve (38) comprising a closing component (44) connected to the internal partition (10), the closing component configured to assume a closure position in which the closing component (44) closes the orifice (36), and the closing component being capable of rising by bending from the closure position,
    the closing component (44) comprising a closure plate (54) for closing the orifice (36) in the closure position, and one or more connection plates (56) rigidly affixed to the internal partition (10) and to the closure plate (54), the closure plate (54) and the one or more connection plates (56) being at least one of having differing thicknesses and being made of materials having differing mechanical characteristics, the one or more connection plates (56) being more flexible than the closure plate (54) such that the one or more connection plates (56) bend and the closure plate (54) does not bend when the closing component (44) rises from the closure position under the effect of a difference of pressure between two opposite sides of the internal partition (10).

2. The silencer according to claim 1, wherein the closure plate (54) and the one or more connection plates (56) are each made of a metallic material.

3. The silencer according to claim 1, wherein the closure plate (54) is a stainless steel plate.

4. The silencer according to claim 1, wherein the closure plate (54) has a thickness of between 0.5 and 5 mm.

5. The silencer according to claim 1, wherein the one or more connection plates (56) has a resilience RP 0.2% (yield strength) of greater than 400 MPa at a temperature of 600° C.

6. The silencer according to claim 1, wherein the one or more connection plates (56) is a refractory steel plate comprising at least 30% by mass of nickel.

7. The silencer according to claim 1, wherein the one or more connection plates (56) has a thickness of between 0.05 and 1 mm.

8. The silencer according to claim 1, wherein the closing component (44) comprises two mutually parallel connection plates (56), each capable of connecting the one or more connection plates (54) to the structure (10).

9. The silencer of claim 1, wherein the valve (38) comprises a strip (46) configured to urge the closing component (44) toward the closure position the connection plate (56) being distinct from the strip (46).

10. The silencer of claim 1, wherein the closure plate (54) and the one or more connections plates (56) are substantially flat.

* * * * *